United States Patent [19]

Lucey et al.

[11] Patent Number: 5,448,646
[45] Date of Patent: Sep. 5, 1995

[54] HEADSET INTERFACE ASSEMBLY

[75] Inventors: Robert E. Lucey, Sudbury; James T. MacDonald, Jr., Pepperell, both of Mass.

[73] Assignee: UNEX Corporation, Chelmsford, Mass.

[21] Appl. No.: 146,728

[22] Filed: Nov. 1, 1993

[51] Int. Cl.$^6$ .............................................. H04R 1/10
[52] U.S. Cl. .......................................... 381/74; 381/25
[58] Field of Search ........................ 381/25, 74, 120

[56] References Cited

U.S. PATENT DOCUMENTS

| | | | |
|---|---|---|---|
| D. 254,847 | 4/1980 | Healey | D13/24 |
| D. 332,600 | 1/1993 | Lucey et al. | D13/133 |
| D. 332,601 | 1/1993 | Lucey et al. | D13/133 |
| 3,610,841 | 10/1971 | Hutchings | 179/156 |
| 4,008,940 | 2/1977 | Foley | 339/91 R |
| 4,146,291 | 3/1979 | Goff et al. | 339/111 |
| 4,536,888 | 8/1985 | Wilson | 381/106 |
| 4,617,431 | 10/1986 | Scott et al. | 179/156 |
| 4,702,538 | 10/1987 | Hutter et al. | 439/292 |
| 4,876,712 | 10/1989 | Brint et al. | 379/387 |
| 4,879,746 | 11/1989 | Young et al. | 379/399 |
| 4,917,504 | 4/1990 | Scott et al. | 381/187 |
| 4,934,959 | 6/1990 | Zielinski et al. | 439/595 |
| 4,951,002 | 8/1990 | Hanon | 330/151 |
| 4,975,949 | 12/1990 | Wimsart et al. | 379/387 |
| 5,036,536 | 7/1991 | Hanon et al. | 379/387 |
| 5,182,774 | 1/1993 | Bourk | 381/74 |
| 5,185,789 | 2/1993 | Hanon et al. | 379/395 |
| 5,235,637 | 8/1993 | Kraz et al. | 379/387 |
| 5,257,318 | 10/1993 | Carroll | 381/74 |
| 5,259,780 | 11/1993 | Morrissey, III et al. | 439/292 |

FOREIGN PATENT DOCUMENTS 1026391 3/1958 Germany .............................. 439/345

Primary Examiner—Stephen Brinich
Attorney, Agent, or Firm—Weingarten, Schurgin, Gagnebin & Hayes

[57] ABSTRACT

An interface assembly for providing an electrical and mechanical interface between a headset and a headset amplifier, includes a transmit signal path for receiving a signal from the headset microphone and for providing an output signal having electrical characteristics compatible with the headset amplifier. The interface assembly also includes a receive signal path for receiving a signal from the headset amplifier and for providing a signal having electrical characteristics compatible with the headset coupled thereto. Compatibility from headset to headset amplifier may be achieved by adjusting one or more characteristics including but not limited to the frequency response, input/output impedance matching, level adjustment and RFI suppression. Compatibility from headset amplifier to headset may be achieved by adjusting one or more characteristics including but not limited to sound pressure protection, frequency response shaping, input/output impedance matching, level adjustment, ground isolation and RFI suppression.

35 Claims, 12 Drawing Sheets

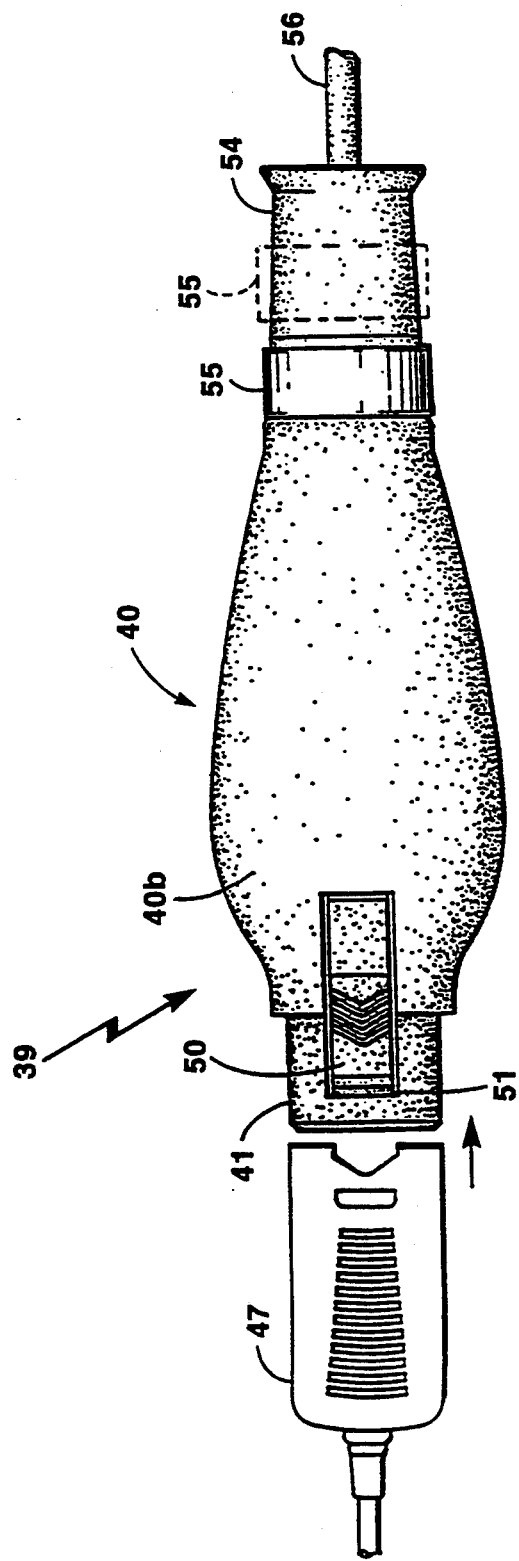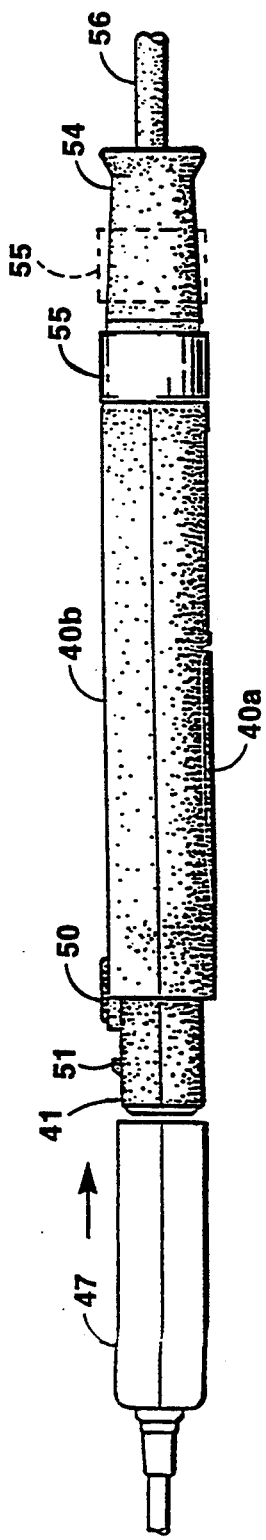

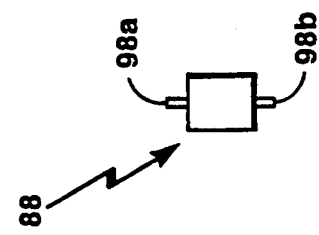
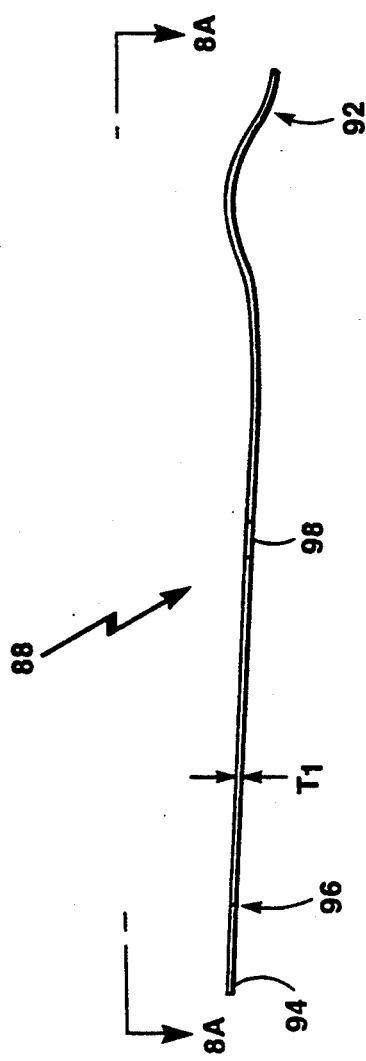
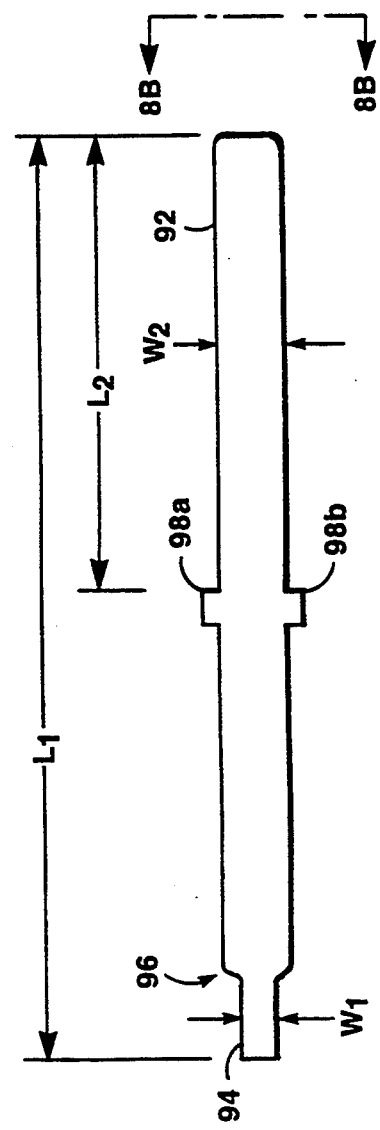

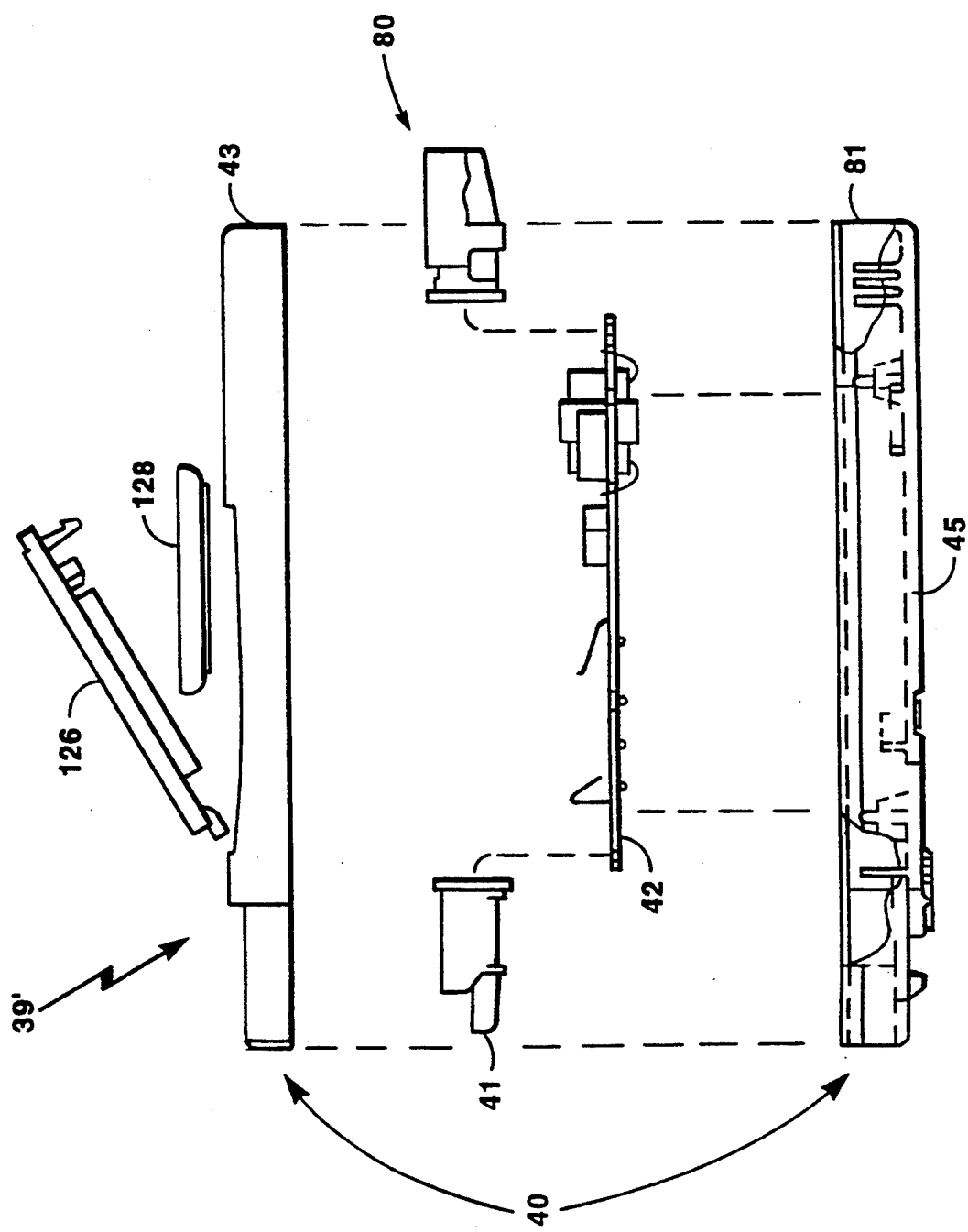

HEADSET INTERFACE ASSEMBLY

FIELD OF THE INVENTION

This invention relates to headset systems and more particularly to adapter boards for use with headset systems.

BACKGROUND OF THE INVENTION

As is known in the art, headset amplifiers produced by one manufacturer are generally provided having electrical and mechanical characteristics which are different from headset amplifiers produced by a second different manufacturer. Furthermore, such headset amplifiers are typically designed such that the mechanical and electrical interfaces are only compatible with headsets produced by that particular manufacturer. There are also cases where a particular manufacturer's earlier generation headsets or amplifiers are mechanically and- /or electrically incompatible with later generation amplifiers or headsets, respectively.

It is sometimes advantageous, however, to couple a headset produced by one manufacturer with a headset amplifier produced by a second different manufacturer or to couple an earlier generation headset of one manufacturer with a later generation headset amplifier of the same manufacturer, or vice versa. Such cross-matching of headsets and headset amplifiers, however, is not easily accomplished because of the above mentioned electrical and mechanical differences between products of different manufacturers or different generations of the same manufacturer.

Thus, it would be desirable to provide an interface circuit for interfacing a headset of one type with an amplifier of a second different type.

SUMMARY OF THE INVENTION

In accordance with the present invention, an adapter board having a first end coupled to a headset and having a second end coupled to a headset amplifier includes a shaping circuit for receiving an input signal having a first frequency response characteristic from the headset microphone and for providing an output signal to an output port of the adapter board and an adapter-board connector coupled between the adapter board and the headset amplifier. The frequency response characteristic of the shaping circuit is selected such that the adapter board provides a signal having predetermined amplitude and frequency response characteristics which are compatible with the headset amplifier coupled thereto. With this particular arrangement, an adapter board for coupling a headset having a first frequency response characteristic to a headset amplifier having a second frequency response characteristic is provided. Thus if the headset amplifier and headset have incompatible electrical characteristics, the adapter board may be disposed therebetween to act as an interface between the otherwise electrically incompatible headset and headset amplifier. Similarly, if the headset and headset amplifier have compatible electrical characteristics but incompatible mechanical characteristics the adapter board may provide a mechanical interface between the otherwise mechanically incompatible headset and headset amplifier. Furthermore if the headset amplifier and headset have both incompatible electrical characteristics and incompatible mechanical characteristics, the adapter board may provide both an electrical and a mechanical interface between the otherwise electrically and mechanically incompatible headset and headset amplifier. Headset amplifiers may be provided having different electrical characteristics. For example one particular type of headset amplifier may be provided having, in a receive signal path, a relatively wide gain bandwidth but provide signals having a relatively low power level. Thus the mating headset and headset microphone may be provided having a relatively narrow bandwidth and may provide additional amplification to the signals fed thereto. Another type of amplifier however may be provided having, in a receive signal path, a relatively narrow gain bandwidth and provides signals having a relatively high power level. In this case, the headset may also be narrowband and may not provide additional amplification to the signals fed thereto. It is possible, of course, to provide a headset amplifier having other gain-bandwidth combinations. The headset adapter of the present invention may be provided having bandwidth and signal level adjustments which allow different types of headsets and headset amplifiers to be coupled together. That is, the adapter board matches impedances, adjusts signal levels and provides adequate power levels such that signals may be transmitted between a headset amplifier having a predetermined gain-bandwidth combination and a headset. In particular, the adapter board allows signals to be efficiently coupled between a receive signal path of a headset amplifier and the headset earphone. Generally, however, the adapter board promotes efficient coupling of signals between the transmit and receive signal paths of a headset amplifier and a headset regardless of the particular electrical and mechanical characteristics the headset amplifier and headset may have. The adapter board may provide in some instances only a mechanical transition between the headset and the headset amplifier. For example, if the headset amplifier is provided having a relatively wide bandwidth and the headset is provided having a relatively narrow bandwidth then no adjustment in bandwidth need be provided by the adapter board. Likewise, the impedance match between particular headset amplifiers and particular headsets may not require any adjustment, but power levels may require adjustment. That is, signals provided between the headset amplifier and the headset may require either amplification or attenuation when being transmitted or received. The adapter board of the present invention may provide such amplification and attenuation.

In accordance with a further aspect of the invention, an adapter-board connector for coupling an adapter circuit to a headset amplifier connector includes a base having a first portion with a plurality of grooves disposed therein wherein a contact is disposed in at least one of the grooves with a first end of the contact coupled to the base. The adapter-board connector further includes a fastener, disposed over the contact, for holding the contact in a predetermined position in the base. With this particular arrangement, an adapter-board connector for coupling a headset adapter board circuit to a headset amplifier is provided. The contact may be provided having a plurality of fingers with each of the fingers disposed in a corresponding one of said grooves of the base. Each of the fingers may be provided having a first end coupled to the base and a second end electrically coupled to a printed circuit board. Alternatively, the contact may be provided having a pin portion and- /or a socket portion to mate with a corresponding pin and socket of a headset amplifier connector. A collar may be disposed over the base for securing the adapter-board connector to a headset amplifier connector. The collar may be provided having a first surface having first and optionally second raised regions which engage with corresponding recesses provided in the adapter-board connector and the headset amplifier connector. When the adapter-board connector is coupled to the headset amplifier connector the collar is disposed in a first locking position to thus secure the two connectors together. However when the collar is disposed in a second non-locking position the adapter-board connector may be decoupled from the headset amplifier connector.

BRIEF DESCRIPTION OF THE DRAWINGS

The foregoing features of this invention as well as the invention itself may be more fully understood from the following detailed description of the drawings in which:

FIG. 4 is a bottom view the adapter board housing of FIG. 3 having a headset amplifier connector coupled thereto;

FIG. 4A is a side view the adapter board housing of FIG. 4 having the headset amplifier connector coupled thereto;

FIG. 8 is a side view of a contact which may be of the type used in the subassembly of FIG. 7B;

FIG. 8A is a top view taken along lines 8A—8A of the contact of FIG. 8;

FIG. 8B is an end view taken along lines 8B—8B of the contact of FIG. 8A;

FIG. 12a is an exploded side view of an adapter board interface circuit; and

DESCRIPTION OF THE PREFERRED EMBODIMENTS

Figure 1:
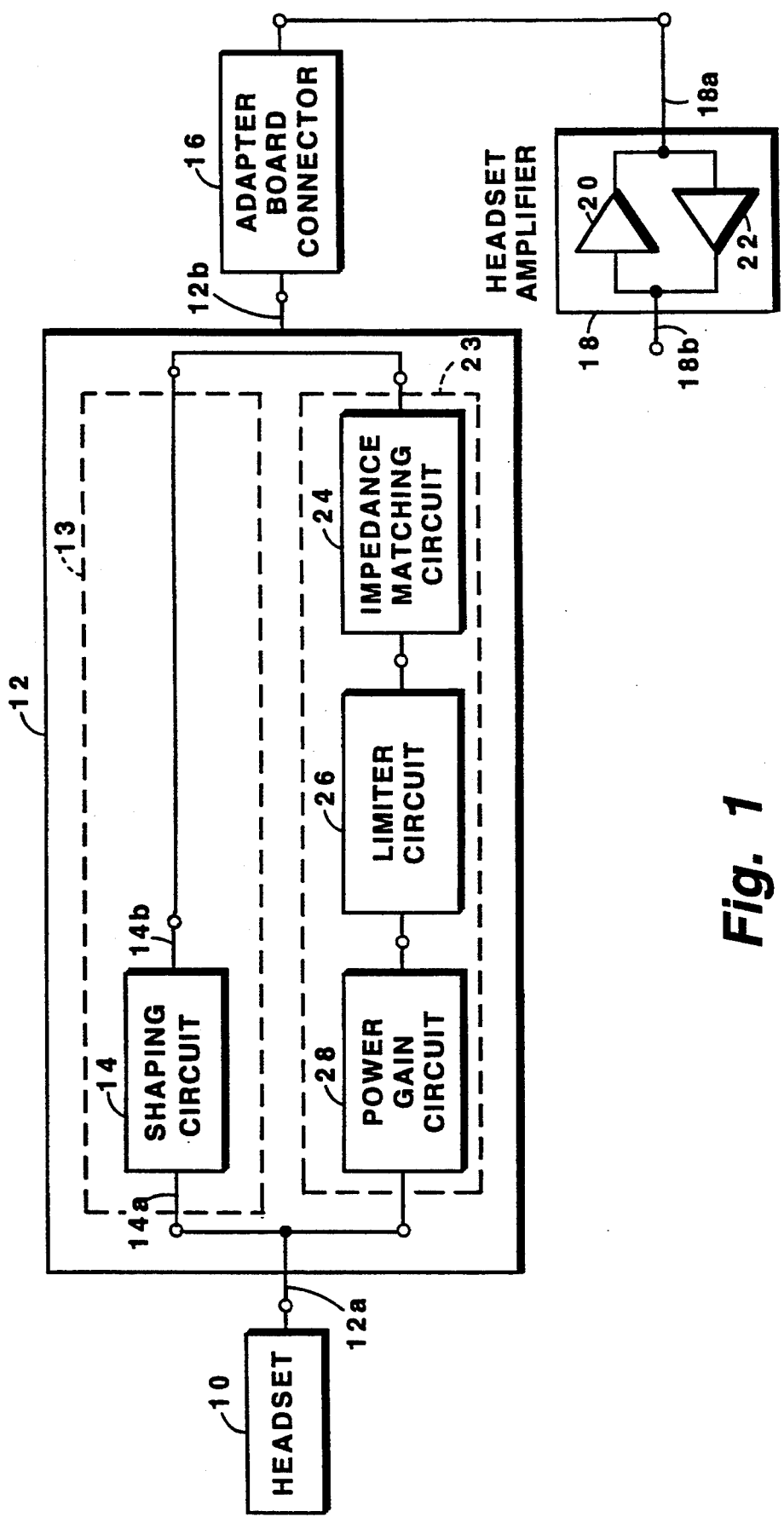
FIG. 1 is a block diagram of a headset coupled to a headset amplifier through an adapter board.

Referring now to FIG. 1, a headset 10 having a first predetermined frequency response characteristic in a predetermined frequency band is coupled to a transmit-receive (TR) adapter board 12 at a first port 12a. An input signal fed from the headset 10 is coupled to a transmit signal path 13 of adapter board 12. The transmit signal path 13 includes a shaping circuit 14. Shaping circuit 14 will be described below in detail in conjunction with FIG. 2. Suffice it here to say that shaping circuit 14 is provided having a preselected frequency response characteristic over a predetermined range of frequencies.

The input signal is fed from TR adapter board 12 through an adapter-board connector 16 to a headset amplifier 18 at a first port 18a. Headset amplifier 18 includes a transmit signal path having a transmit amplifier 22 provided therein. Transmit amplifier 22 receives signals fed thereto and provides amplifier output signals at a port 18b of headset amplifier 18.

Headset amplifier 18 also includes a receive signal path having a receive path amplifier 20. Amplifier 20 transmits signals to TR adapter board 12 through adapter-board connector 16. Receive signals are coupled through a receive signal path 23 of TR adapter board 12.

Receive signal path 23 includes an impedance matching circuit 24 having a first port coupled to adapter board port 12b and a second port coupled to an input port of a limiter circuit 26. An output port of limiter circuit 26 is coupled to an input port of a power gain circuit 28. The power gain circuit provides amplified signals to the headset 10 and also limits the power level of signals fed to headset 10.

It should be noted that receive signal path 23 may also include a shaping circuit similar to shaping circuit 14 and likewise transmit signal path 13 may also include impedance matching circuits, limiter circuits and amplifier circuits. The decision to include or omit particular circuits in the transmit and receive signal paths 13, 23 is made in accordance with the particular electrical characteristics of the headset 10 and headset amplifier 18 being coupled together through adapter board 12.

Figure 2:
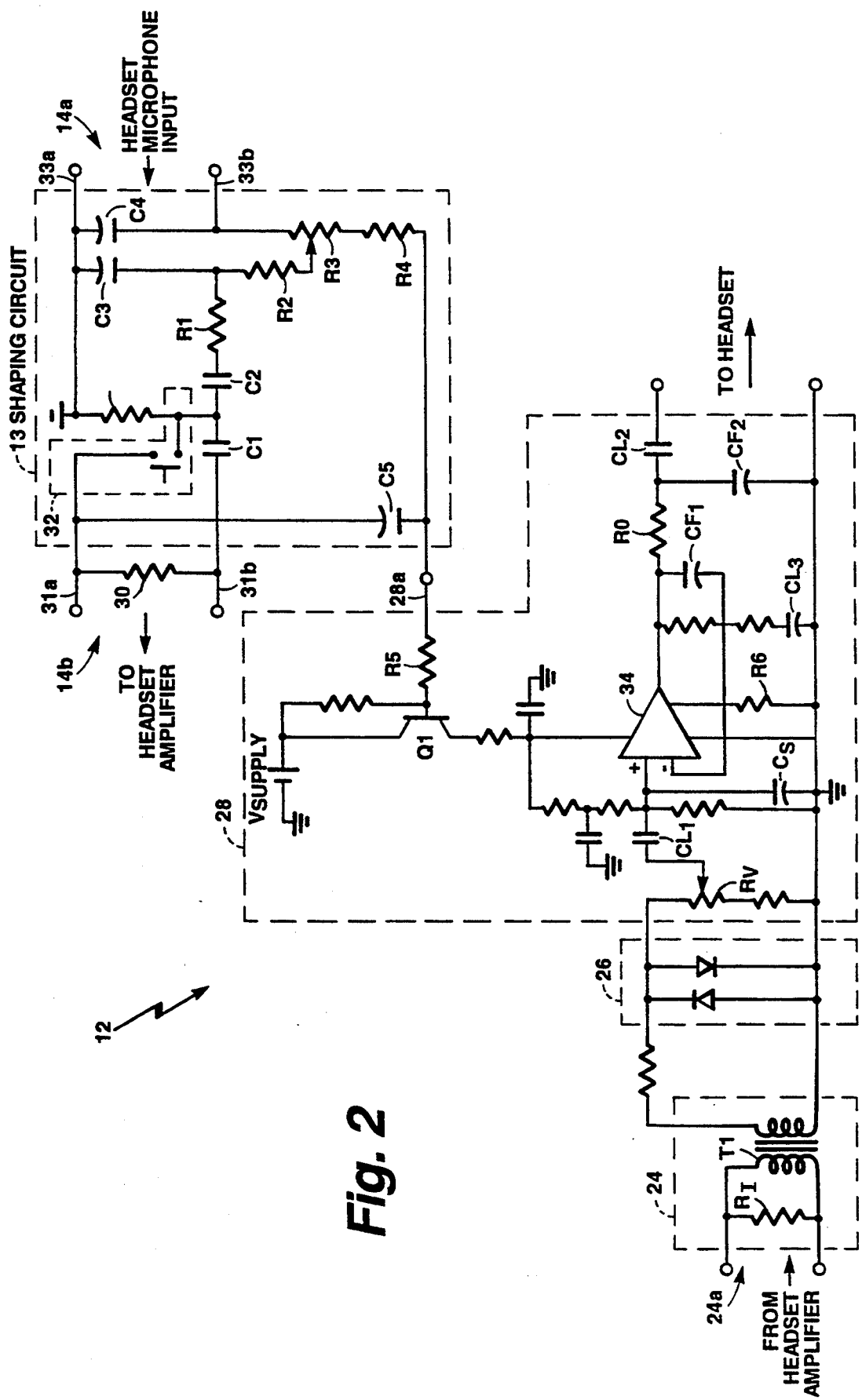
FIG. 2 is a schematic diagram of the adapter board shown in FIG. 1.

Referring now to FIG. 2 in which like elements of the TR-adapter board 12 of FIG. 1 are provided having like designations, shaping circuit 14 is here shown to include a bias resistor 30 coupled between a pair of output terminals 31a, 31b and an optional mute circuit 32. Mute circuit 32 functions to shunt microphone signals to ground while avoiding a clicking sound as is generally known. Here capacitors C1, C2 are coupled to a first electrode of a resistor R9. A second electrode of resistor R9 is coupled to ground. Resistor R9 provides a signal path to ground through which a trickle charge from the capacitors C1, C2 may flow. Thus when mute circuit 32 provides a shunt path to ground there is no clicking sound generated as would normally be generated from the discharge of capacitors C1, C2.

When a microphone (not shown) from the headset 10 (FIG. 1) is connected to adapter board 12, the microphone draws a sufficient amount of current from a transistor Q1 to switch transistor Q1 on and power is thus supplied to an amplifier 34 through transistor Q1. When the microphone is disconnected from adapter board 12, transistor Q1 switches off and thus prevents power from being supplied to the amplifier 34.

An RF filter capacitor C4 is coupled between terminals 33a, 33b and thus across the microphone input at shaping circuit port 14b. Filter capacitor C4 may also provide frequency shaping characteristics. That is, in some applications capacitor C4 may be provided having a capacitance value typically of about 0.01 microfarad to thus act as an RFI capacitor. In some applications, however, capacitor C4 may be provided having a value typically of about 0.047 microfarad. In this case capacitor C4 acts as an RFI capacitor and contributes to a high frequency roll-off characteristic of shaping circuit 14.

Shaping circuit 14 further includes a capacitor C1 having a first electrode coupled to input port 14a and a second capacitor C2 having a first electrode coupled to a second electrode of capacitor C1 and a second electrode coupled to a resistor R1 at a first electrode thereof. A second electrode of resistor R1 is coupled to a first electrode of a capacitor C3 whose second electrode is coupled to ground. The second electrode of resistor R1 is also coupled to a first electrode of resistor R2.

A second electrode of resistor R2 is coupled to a first electrode of a variable resistor R3. A second electrode of resistor R3 is coupled to terminal 33b. A third electrode of resistor R3 is coupled to a first electrode of resistor R4. A second electrode of resistor R4 is coupled to power gain circuit 28 at a terminal 28a. Resistor R4 receives a filtered DC voltage through a DC filter circuit provided from capacitor C5 and resistor R5 and limits the microphone gain adjustment range. The resistance of resistor R4 may thus be selected to provide a limited microphone sensitivity adjustment while the resistance at the first electrode of variable resistor R3 may be selected to adjust the microphone output signal amplitude. Thus when the resistance of R3 is set at a maximum the microphone output signal is at a minimum. Conversely, when resistor R3 is provided having a minimum resistance, the microphone output signal is at a maximum. Resistor R4, however, prevents the microphone output signal from corresponding to zero.

Headset 10 described in conjunction with FIG. 1 is provided having a predetermined frequency response characteristic and may provide signal gain to signals at a particular frequency or in a range of frequencies. For example, headset 10 may be provided having an acoustical filter and a microphone which provides a particular frequency response and in particular may provide a high gain characteristic at a particular frequency or within a particular range of frequencies. Likewise, headset amplifier 18 is provided having a predetermined frequency response characteristic at a particular frequency or range of frequencies.

The shaping circuit thus has a frequency response selected to minimize the effect of the frequency response characteristic of the headset especially at the high end of the frequency range of interest. This is to avoid so-called double pre-emphasis. Thus if headset 10 were not provided having gain at a particular frequency then shaping circuit 14 may be provided having a different frequency response characteristic or alternatively in some instances could be omitted. For example, shaping circuit 14 may simply include one or more short circuit signal paths between the microphone input port and the input port of the headset amplifier.

Similarly In those cases where headset amplifier 18 is not provided having a gain characteristic, then the gain should be provided by headset 10. Thus, the particular frequency response characteristic of shaping circuit 14 may be selected to ensure that the overall frequency response provided by the combination of the headset 10, shaping circuit 14 and headset amplifier 18 corresponds to a desirable response characteristic. Specifically it is desirable to provide signals having a signal amplitude within a predetermined range such that signals provided to a user are clear and are not distorted.

Furthermore, headset amplifier 18 (FIG. 1) is provided having a predetermined output impedance. Similarly, headset 10 is provided having a predetermined input impedance. If the output impedance of the headset amplifier 18 matches the input impedance of headset 10 then optimum performance results. However, often the output impedance of headset amplifier 18 is significantly different from the input impedance of headset 10. It would thus be desirable to match the output impedance of headset amplifier 18 to the input impedance of headset 10.

For example, the output impedance of headset amplifier 18 may typically be of about 300 ohms. However, the input impedance of headset 10 may, for example, correspond to 32 ohms. Thus, to provide an optimal response, headset amplifier 18 is coupled to an impedance matching and isolation circuit 24.

Circuit 24 here includes a resistor and an impedance matching and/or isolation transformer coupled as shown. Circuit 24 matches the 300 ohm output impedance of headset 18 amplifier to an impedance level compatible with the input impedance of power gain circuit 28. More importantly, perhaps, transformer 24 provides isolation such that no common ground exists between transmit and receive signal paths. Amplifier 34 is preferably selected having an input impedance selected to match the output impedance of the headset amplifier coupled thereto. Amplifier 34 is also preferably selected having an output impedance selected to match the input impedance of the headset coupled thereto.

Those of ordinary skill in the art will recognize of course that impedance matching circuit 24 need not be provided as a transformer, rather any impedance matching circuit such as an operational amplifier having a series input resistor may also be used. Those of ordinary skill will also recognize that the particular impedance matching performed depends upon the impedance levels at the input port of headset 10 and the output port of headset amplifier 18.

Impedance matching circuit 24 is coupled through a protection or limiter circuit 26, here provided as a pair of protective diodes, to a power gain circuit 28. Protection circuit 26 prevents signals having excessive voltage and current levels which would damage circuit components in signal path 23 from being fed to the remaining circuitry of adapter board 12.

Receive signal path amplifier 34 may be provided, for example as a low voltage operational amplifier of the type manufactured by Signetics Corporation and identified as part number NE-5230D. Those of ordinary skill in the art will recognize of course that any amplifier having similar electrical characteristics may also be used. In particular, however, a low current device having a voltage gain characteristic typically of about 20 dB is preferred.

Those of ordinary skill will also recognize that in some applications it may be desirable to provide power gain stage 28 having a plurality of amplifiers and that the overall gain provided by power gain stage 28 should be such that a signal having an appropriate signal level may be fed to headset 10.

Furthermore, it is desirable to prevent abnormally high current or voltage signal levels such as spike currents or voltages from being fed to the headset 10. As mentioned above, such abnormally high signal levels may damage the headset user's ears. The signals fed to the headset user's ears should be below the safety standards limits for telephone equipment set by UL-1459.

Adapter board 12 prevents such signals from reaching headset 10 in two ways. First, protection circuit 26 protects power gain circuit 28, including transistor Q1 and amplifier 34, from abnormally high signal levels fed through port 24a. Second, the maximum output of amplifier 34 is directly proportional to the battery voltage $V_{SUPPLY}$ which here corresponds to three volts. Thus, regardless of the input signal level fed to amplifier 34, amplifier 34 provides an output signal having an amplitude which can not exceed a 3 volt peak-to-peak signal level. The value of $V_{SUPPLY}$ and the output impedance level of amplifier 34 is selected to provide a signal having a maximum signal level within the acceptable range of signal levels which may be provided to headset 10 and consequently the user, and which does not exceed the maximum sound pressure level specified in UL-1459.

Those of ordinary skill in the art will now recognize, however, that supply voltage $V_{SUPPLY}$ could be set to provide any desirable maximum peak-to-peak signal level within the acceptable operating signal range of amplifier 34. For example, the output signal could be set at a maximum of 2 volts peak-to-peak. Alternatively, the output signal could be set at a maximum of 1 volt peak-to-peak, or 4 volts peak-to-peak by simply adjusting the value of $V_{SUPPLY}$.

The reference voltage $V_{SUPPLY}$ is thus selected to ensure that regardless of the signal level of the input signal fed to op-amp 34, the signal level of the output signal provided by op-amp 34 cannot exceed a safe level to drive headset 10. Here, a safe signal level is defined to mean any signal power level which allows headset 10 to output a sound signal of no more than 110 dB of sound pressure.

Thus, regardless of the input signal level fed to the input port of amplifier 34, the output signal provided by amplifier 34 at most swings rail to rail to thus provided a 3 volt peak to peak signal. Thus if amplifier 34 was provided having 20 dB gain, then an input signal having a voltage of 0.3 V may drive amplifier 34 close to or possibly into its saturation state.

It should be noted that in receive signal path 23, capacitors $C_{F1}$, $C_{F2}$ provide a particular frequency response characteristic to signals having a relatively high frequency. Capacitors $C_{L1}$, $C_{L2}$, $C_{L3}$, on the other hand, provide a particular frequency response characteristic to signals having a relatively low frequency.

Adapter circuit 42 thus matches the signal transfer functions of the headset amplifier and the headset. Table 1 shows the particular circuit components whose values may be adjusted to provide a corresponding change in particular electrical characteristics and functions of transmit signal path 13 of adapter circuit 12.

TABLE 1

| | |
|---|---|
| shaping circuit frequency response | C1, C2, C3, C4 |
| input impedance matching | R3, R4 |
| signal level adjustment | R3 |
| RFI reduction | C4 |

Similarly, Table 2 shows the particular circuit components which may be adjusted to provide a corresponding change in particular electrical characteristics and functions of receive signal path 23 of adapter circuit 12.

TABLE 2

| | |
|---|---|
| protection for excessive sound pressure levels via output limiting | $V_{supply}$ |
| protection for excessive sound pressure levels via input limiting | limiter cir. 26 |
| input impedance matching | RI, T1 |
| output impedance matching | RO |
| isolation | T1 |
| signal level adjustment | $R_V$ |
| shaping circuit high frequency response | $C_{F1}$, $C_{F2}$ |
| shaping circuit low frequency response | $C_{L1}$, $C_{L2}$, $C_{L3}$ |
| RFI reduction | $C_S$ |

Thus, adapter circuit 12 provides means for adjusting signal characteristics including but not limited to input-/output impedances, gain, and frequency response of signals coupled between the headset and headset amplifier.

It is relatively easy to change a particular characteristic or characteristics of adapter circuit 12 by changing values of corresponding ones of the circuit components listed in Tables 1 and 2 above. Consequently, by adjusting the values of the appropriate circuit components a variety of different combinations of headsets and headset amplifiers, each having different electrical characteristics, may be coupled together via adapter circuit 12 or an adapter circuit similarly constructed.

Figure 3:
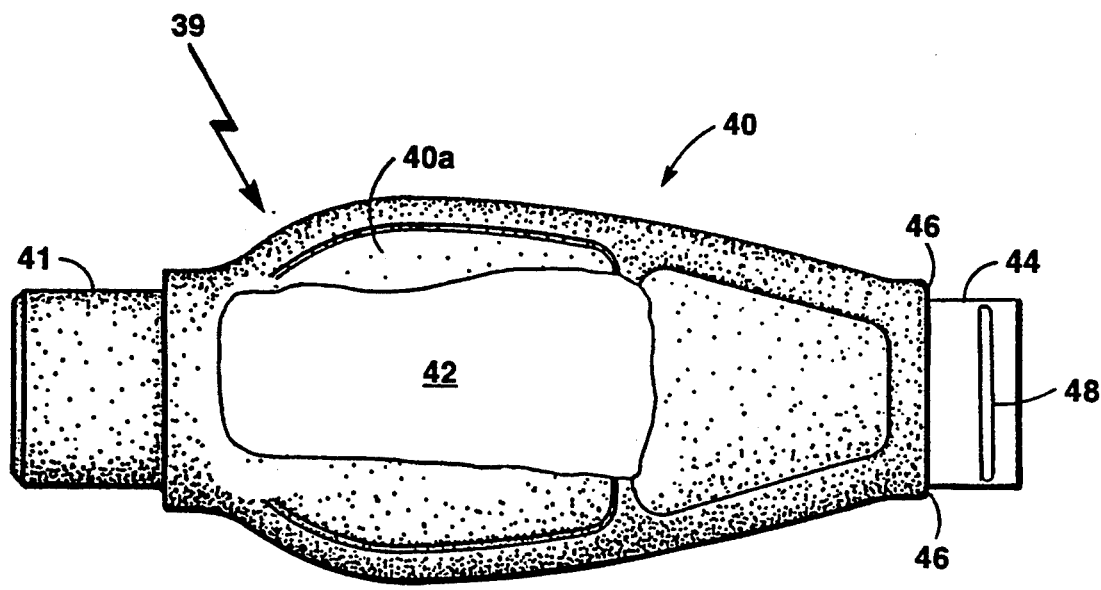
FIG. 3 is a top view of an adapter board housing having a portion thereof removed to expose an adapter board circuit.

Referring now to FIG. 3, an adapter board assembly 39 includes an adapter board housing 40 having a first surface 40a here shown having a portion thereof removed to expose a printed circuit adapter board circuit 42 disposed in a cavity region of housing 40. Housing 40 includes a first connector portion 41 for connecting to a headset (not shown) and a second connector portion 44 for connecting to a headset amplifier connector 54 (FIGS. 4 and 4A). Connector portion 44 projects from an end surface 46 of housing 40 and includes a recess region 48 here shown having a slot shape. Those of ordinary skill will recognize of course that recess region 48 may be provided having any shape including but not limited to circular, square, rectangular or even an irregular shape.

Although adapter board 12 and the associated transmit and receive signal paths 13, 23 are here disposed in housing 40 those of ordinary skill in the art will recognize that adapter board 12 could be provided as an integrated portion of headset 10. That is, headset 10 could be provided having transmit and receive circuits 13, 23, disposed therein and thus eliminate the need for a separate housing or other circuitry disposed in a signal line coupled between headset 10 (FIG. 1) and headset amplifier 18 (FIG. 1). In such an embodiment, adapter-board connector may be provided as part of the headset cable or merely as a separate connector which provides a mechanical interface between a headset connector and an amplifier connector which would not mate with the headset connector without such a mechanical interface.

The electrical interface provided in the adapter-board connector in such an arrangement could be a plurality of signal paths which simply connect contacts from the headset connector to corresponding contacts of the headset amplifier.

Referring now to FIGS. 4 and 4A in which like elements of adapter board housing 40 of FIG. 3 are provided having like reference designations, adapter board housing 40 is shown coupled to a headset amplifier connector 54 having a cord 56. Cord 56 couples connector 54 to a headset amplifier (not shown).

A second surface 40b of adapter board housing 40 has disposed thereon a detent mechanism here provided from a flexible member 50 having a raised portion 51. When a headset (not shown) is coupled to the housing 40, a mating connector 47 of the headset is coupled to the mating portion 41. The headset connector has a groove formed therein in a position corresponding to the position of raised portion 51. Thus when the headset connector and adapter-board connector 41 are mated, raised portion 51 engages the groove and secures the headset to the adapter board housing 40. Electrical connections between the headset and the printed circuit adapter board 42 (FIG. 3) are made through a plurality of electrical contacts (not shown) disposed in the connector 41.

Connector portion 44 (FIG. 3) mates to headset amplifier connector 54 and a collar 55 is disposed in a first position over the mating portions of connectors 44 and 54. In the first position, collar 55 secures the two connectors 44 and 54 such that the connectors 44, 54 cannot be uncoupled from each other. Thus headsets may be freely connected and disconnected from connector 41 without disconnecting the adapter board 42 from the headset amplifier connector 54 to thus maintain electrical contact between adapter board 42 and the headset amplifier.

If, however, it is desired to uncouple connectors 44 and 54 to disconnect the headset amplifier from the housing 40 and adapter board 42, collar 55 should be placed in a second different position as shown in phantom in FIGS. 4 and 4A. Thus as will be described further below in conjunction with FIGS. 6 and 6A the connectors 44 and 54 may be separated.

Figure 5:
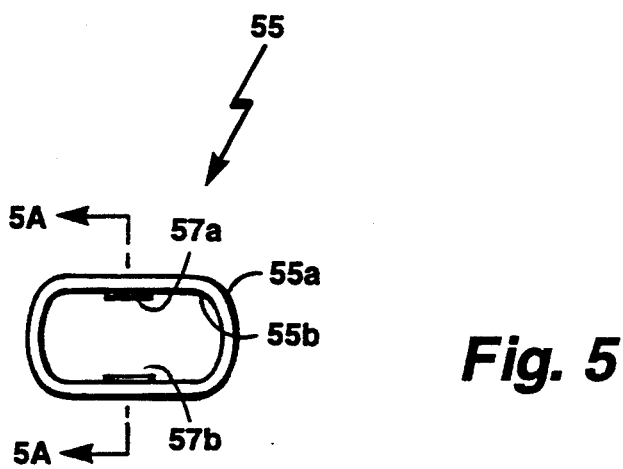
FIG. 5 is a front view of a locking collar.
Figure 5A:
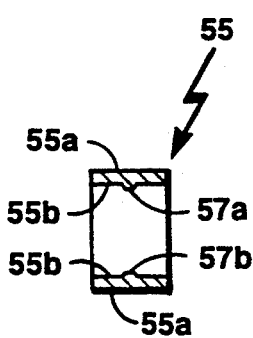
FIG. 5A is a cross sectional view of the locking collar of FIG. 5 taken along lines 5A—5A.

Referring now to FIGS. 5 and 5A, collar 55 is provided as a substantially rectangular shaped member having slightly arcuate ends 59 and having an opening therethrough. The collar may be made from Polycarbonate, Acrylonitrile-Buyadiene-Styrene (ABS) plastic, modified Phenylene Oxide (PPO) plastic or any other like material having similar mechanical characteristics. Those of ordinary skill in the art will recognize of course that collar 55 may be provided having any shape and the particular shape, including but not limited to circular or square shapes of collar 55 is preferably selected to correspond to the shape of adapter housing connector portion 44 and headset-amplifier connector 54 such that the collar 55 is movable along length of either the headset amplifier connector 54 as shown or the adapter-board connector portion 44.

Collar 55 has first and second opposing surfaces 55a, 55b. A pair of ribs 57a, 57b are disposed on surface 55b of collar 55. As will be described further below, in some embodiments collar 55 may include only a first one of the ribs 57a, 57b. A first one of ribs 57a, 57b fits into groove 48 (FIG. 3) of the adapter-board connector portion 44 and a second one of ribs 57a, 57b fits into a corresponding groove 74 (FIGS. 6 and 6A) of the headset amplifier connector 68. Thus when headset amplifier connector 54 and adapter-board connector 44 are mated and collar 55 is placed in the first position, ribs 57a, 57b engage respective ones of the grooves 48, 74 and secure the headset amplifier to the adapter board housing 40. Electrical connections between the headset amplifier and the printed circuit adapter board 42 (FIG. 3) are made through a plurality of contacts (not shown) disposed in the connector 44.

Those of ordinary skill in the art will appreciate of course that ribs could be provided in the mating connector portions 44, 54 and that grooves could be provided on surface 55b of collar 55. Furthermore, although collar 55 is here provided having continuous inner and outer surfaces 55a, 55b collar 55 may also be provided as a substantially C-shaped member or having a hinged wall such that the collar may be opened and placed around the connectors 44, 54 rather than being slid over the connector.

Those of ordinary skill will also appreciate that collar 55 may be provided as a unitary piece using any manufacturing technique including but not limited to injection molding techniques, extrusion techniques or any other well-known manufacturing technique. Alternatively collar 55 may be provided from multiple pieces. As those of ordinary skill will appreciate, the particular number of pieces from which collar 55 may be provided, the particular manufacturing techniques used and the particular material from which collar 55 is provided should all be selected to provide a low cost, reliable collar 55 having sufficient strength to withstand multiple connections and disconnections of connectors 44 and 54.

Furthermore, as described above the shape of ribs 57a, 57b should correspond to the shape of the recesses 48, 74 such that ribs 57a, 57b engage recesses 48, 74. Thus, if recess 48 were provided having a circular shape and recess 74 were provided having a square shape then corresponding ones of the ribs 57a, 57b should be provided having corresponding shapes such that a first one of the ribs 57a, 57b could engage recess 48 and a second one of the ribs 57a, 57b could engage recess 74.

Figure 6:
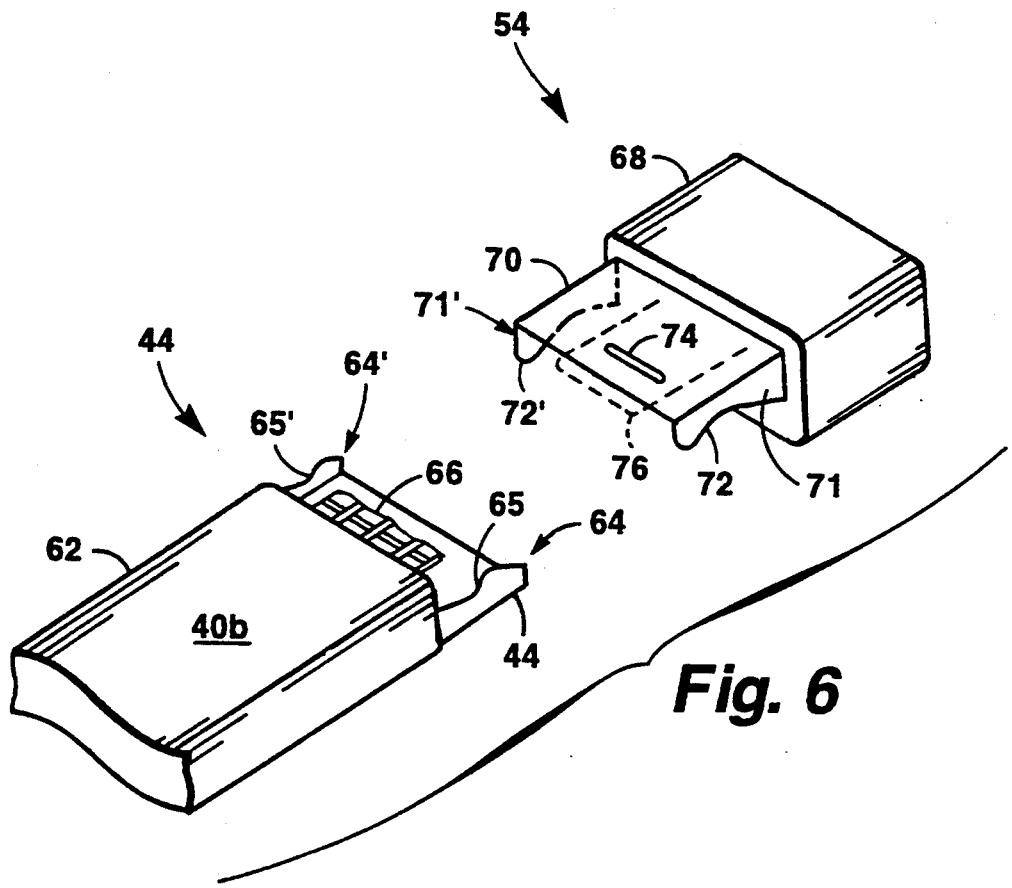
FIGS. 6 and 6A are a series of perspective views of mating portions of an adapter board and a headset amplifier connector.
Figure 6A:
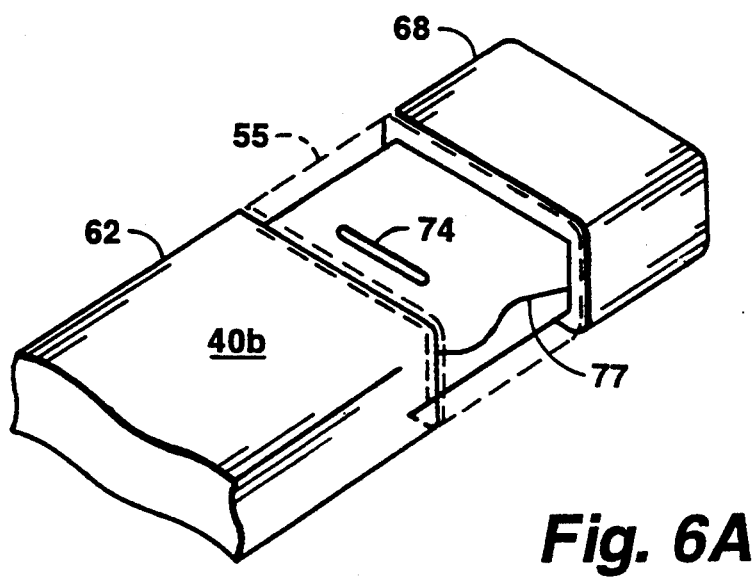

Referring now to FIGS. 6 and 6A, a portion 62 of adapter board housing 40 and a portion 68 of headset amplifier connector 54 are shown. Portion 62 of adapter board housing 40 includes adapter board mating portion 44. Similarly, portion 68 of headset amplifier connector 54 includes a corresponding mating portion 70.

Mating portion 44 includes side portions 64, 64' having an S-shaped surface 65, 65'. Mating portion 70 includes side portions 71, 71', having an S-shaped surface 72, 72'.

As shown in FIG. 6A, when mating portions 44, 70 are engaged, corresponding ones of the side portions 64, 64' and 71, 71' engage and the corresponding S-shaped surfaces 65, 65' and 72, 72' interlock to form a seam 77. Collar 55 is then disposed over the mating portions 44, 70 to securely hold the portions together.

Figure 7:
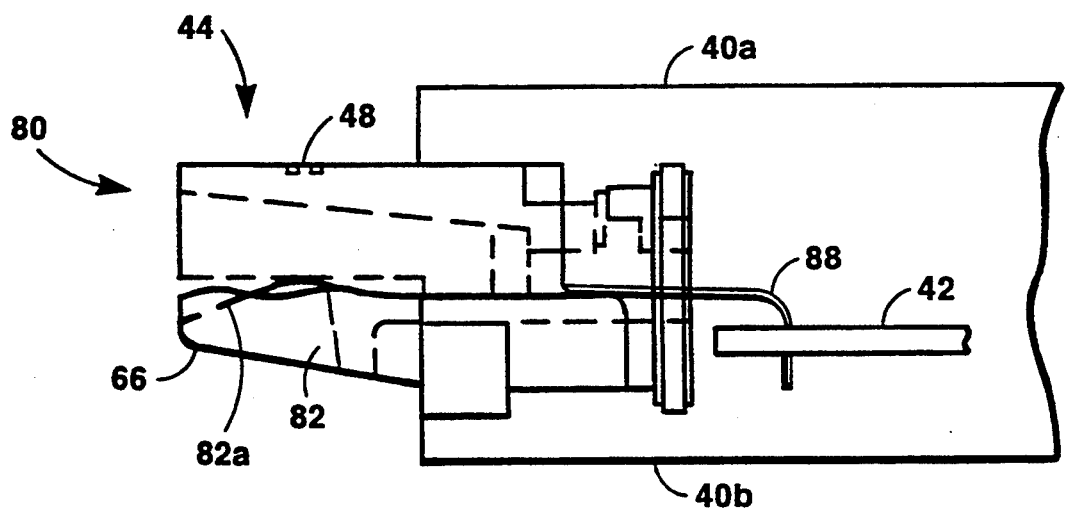
FIG. 7 is partial cross sectional view of a connector subassembly mounted in a connector housing and coupled to a printed circuit board.
Figure 7A:
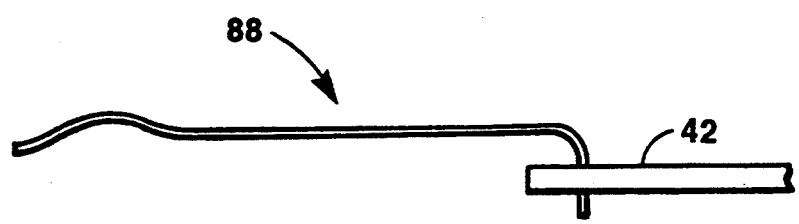
FIG. 7A is a side view of a contact which may be of the type used in the subassembly of FIG. 7 disposed in a printed circuit board.
Figure 7B:
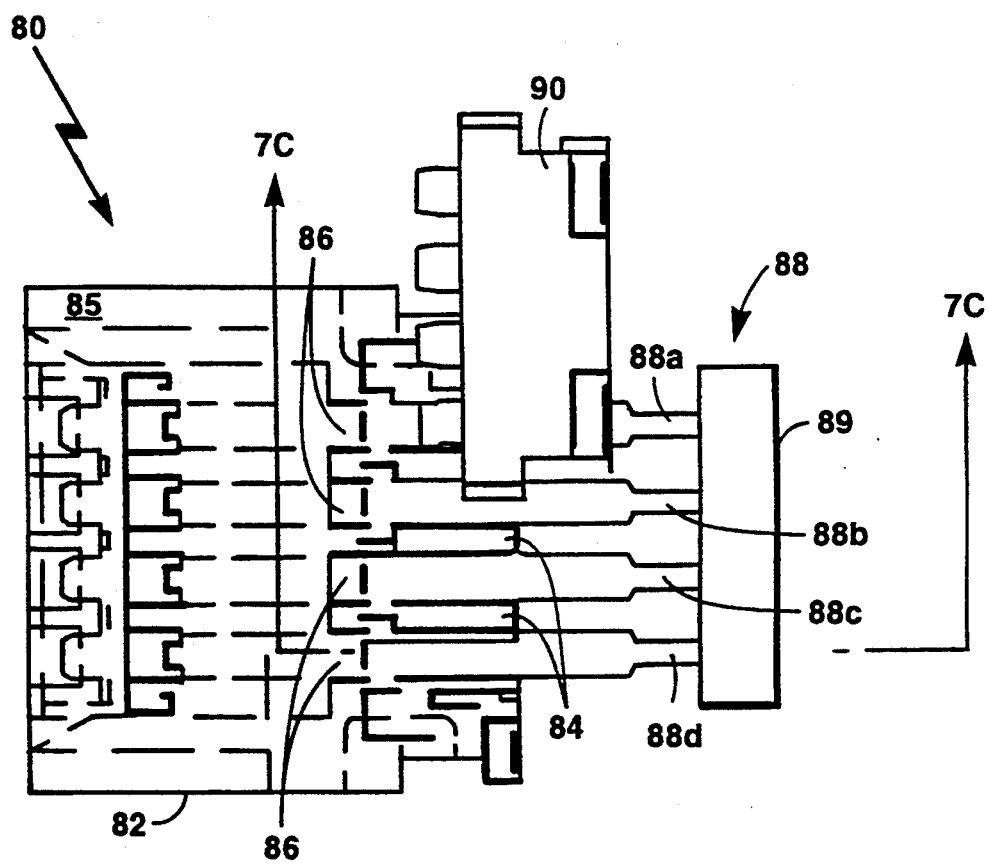
FIG. 7B is a top view of a connector subassembly.
Figure 7C:
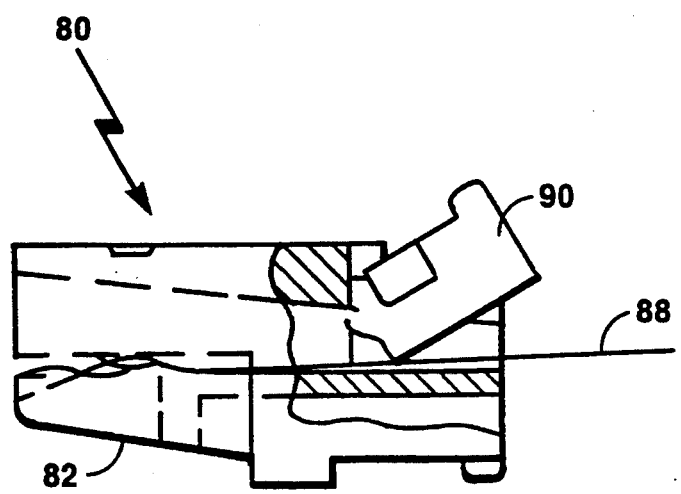
FIG. 7C is a cross sectional view taken along lines 7C—7C of the connector subassembly of FIG. 7B.

Referring now to FIGS. 7–7C, in which like elements of FIGS. 3–6A are provided having like reference designations, connector portion 44 is shown to include a subassembly contact housing 80. Subassembly contact housing 80 includes a base portion 82 have a plurality of ribs 84 formed on a surface 85 thereof. The ribs 84 are spaced to thus provide a plurality of grooved regions between ribs 84.

Subassembly contact housing 80 further includes a contact assembly 88 having a plurality of contact fingers 88a–88d joined one end by a cross member carrier strip 89. Contact assembly 88 will be described in detail further below in conjunction with FIGS. 8–8B. Suffice it here to say contact assembly 88 is disposed in the base portion 82 such that the contact fingers 88a–88N are each disposed in a corresponding one of the grooves 86 and the first end of the contact finger is under the angled wall 82a of base portion 82 to act as a holding partition necessary for the required contact spring preload which is typically of about 15 grams of force and which is required to maintain the position of the contact.

A fastener 90 is then disposed onto base 82. Fastener 90 is dimensioned to provide a snap fit into base 82 and to securely hold the contact fingers 88a–88d in a predetermined position, and to provide mechanical preload of contact fingers 88. Next, carrier strip 89 is detached from contact fingers 88. A portion of the contact fingers are then bent with a predetermined radius such that fingers 88 may be coupled to printed circuit board 42 as shown in FIG. 7A.

Referring now to FIGS. 8–8B, a representative one of the plurality of contact leafsprings 88a–88N having first and second ends 92, 94 and a length $L_1$ includes a first tapered region 96 such that second end of 94 of leafspring contact 88 is provided having a width $W_1$ which is less than the width $W_2$ of the first end 92.

A distance $L_2$ from first end 92 are pair of opposing projections 98a, 98b. Projections 98a, 98b engage corresponding recesses in the contact base to provide precise location and to avoid axial slippage of the contact leafspring relative to the contact base. The contacts are thus locked into position. Leafspring contact 88 may be provided, for example, from beryllium copper (BeCu) having a gold plating disposed thereover.

Contact 88 is bent in a region proximate the second end 94 of contact 88 such that region 94 may be disposed through an aperture in a printed circuit board to thus make electrical contact with the printed circuit board. After region 94 is disposed on a printed circuit board a solder joint or other electrical connection may then be made to ensure that electrical contact is made and maintained.

Lengths $L_1$, $L_2$, widths $W_1$, $W_2$ and the material from which contact 88 is made may be selected such that contact 88 may be disposed in the subassembly 80 and such that contacts 88 are provide having sufficient strength and electrical conductivity to provide low loss electrical signal paths between adapter board 42 and headset amplifier 18 (FIG. 1). In particular, however, the widths $W_1$ and $W_2$ and thickness $T_1$ of contacts 88 should be selected such that contacts 88 do not fracture or significantly weaken when bent.

Figure 9:
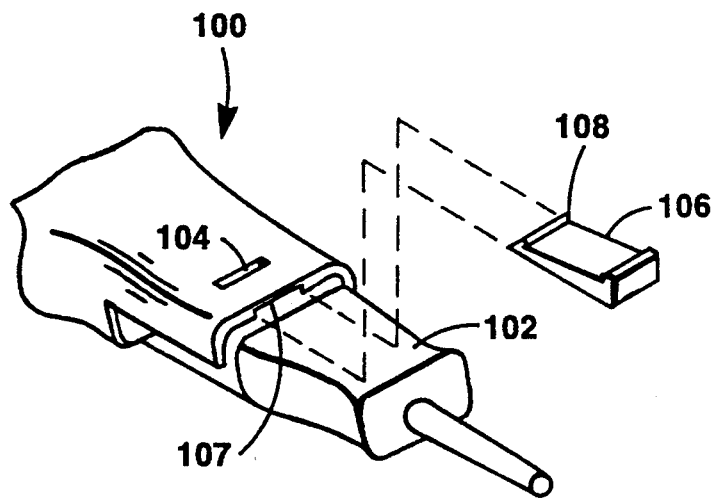
FIG. 9 is a perspective view of mating portions of an adapter board interface connector and a headset amplifier connector having a locking element provided as a shim.

Referring now to FIG. 9, an adaptor board connector 100 is coupled to a headset amplifier connector 102. Adaptor board connector 100 is provided having an aperture 104 therethrough. A connecting shim 106 is disposed through a raised portion 107 of connector 100 such that a locking portion 108 of shim 106 is disposed through the aperture 107 to thus secure together connectors 100, 102.

Figure 10:
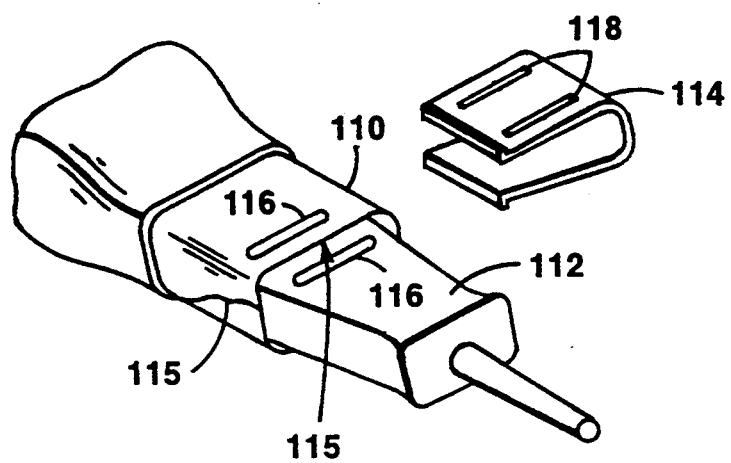
FIG. 10 is a perspective view of mating portions of an adapter board interface connector and a headset amplifier connector having a locking element provided as a clip.

Referring now to FIG. 10, an adaptor board connector 110 is coupled to a headset amplifier connector 112. Here, the connectors 110, 112 mated with an adhesive disposed in the seams 115 of the mating connector surfaces. A clip 114, having an inner surface 114a, and an outer surface 14b, is selected having a size such that clip 114 may be disposed over the connectors 110, 112 to securely hold the connectors together. Clip 114 may be provided from any material including but not limited to steel, rubber, plastic or any other material which may be manufactured having sufficient strength to secure the connectors 110, 112.

Connectors 110, 112 are each provided having apertures 116 into which corresponding ribs 118 provided on inner surface 114a of clip 114 are provided. Clip 114 is disposed over the connectors 110, 112 such that ribs 118 are disposed in the apertures 116 of connectors 110, 112. Those or ordinary skill in the art will recognize of course that in an alternative embodiment, connectors may have raised portions in place of apertures 116 and clip 114 may have apertures in place of ribs 118 such that the raised portions may interlock therewith.

Figure 11:
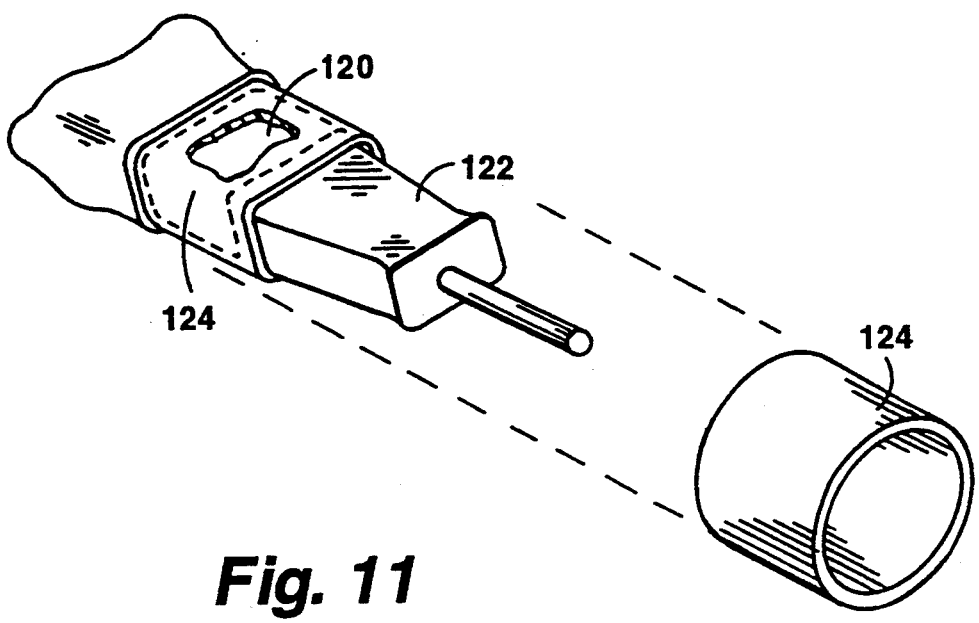
FIG. 11 is a perspective view of mating portions of an adapter board interface connector and a headset amplifier connector having a locking element provided as a shrink wrap tubing.

Referring now to FIG. 11, an adaptor board connector 120 is coupled to a headset amplifier connector 122. A heat shrink tubing 124 has been disposed over the mated connectors and heated to securely hold the two connectors together. Furthermore, the heat shrink tubing may form a relatively tight seal about the connectors and thus prevent moisture from entering the connectors through seams provided by mating connector surfaces.

Those of ordinary skill in the art will recognize that other means of securely holding the two connectors together may also be possible. For example, a fastening tape may be wrapped about the connectors. One type of fastening tape includes a piece of fabric, having first and second opposing surfaces. A first one of the pair of surfaces has in at least a portion thereof an arrangement of hooks disposed thereon. A second one of the opposing pair of surfaces has in at least a portion thereof a pile disposed thereon. The hooks and pile interlock when pressed together to thus secure the fastening tape about the connectors. Such an arrangement is commonly referred by the trademark VELCRO.

Figure 12:
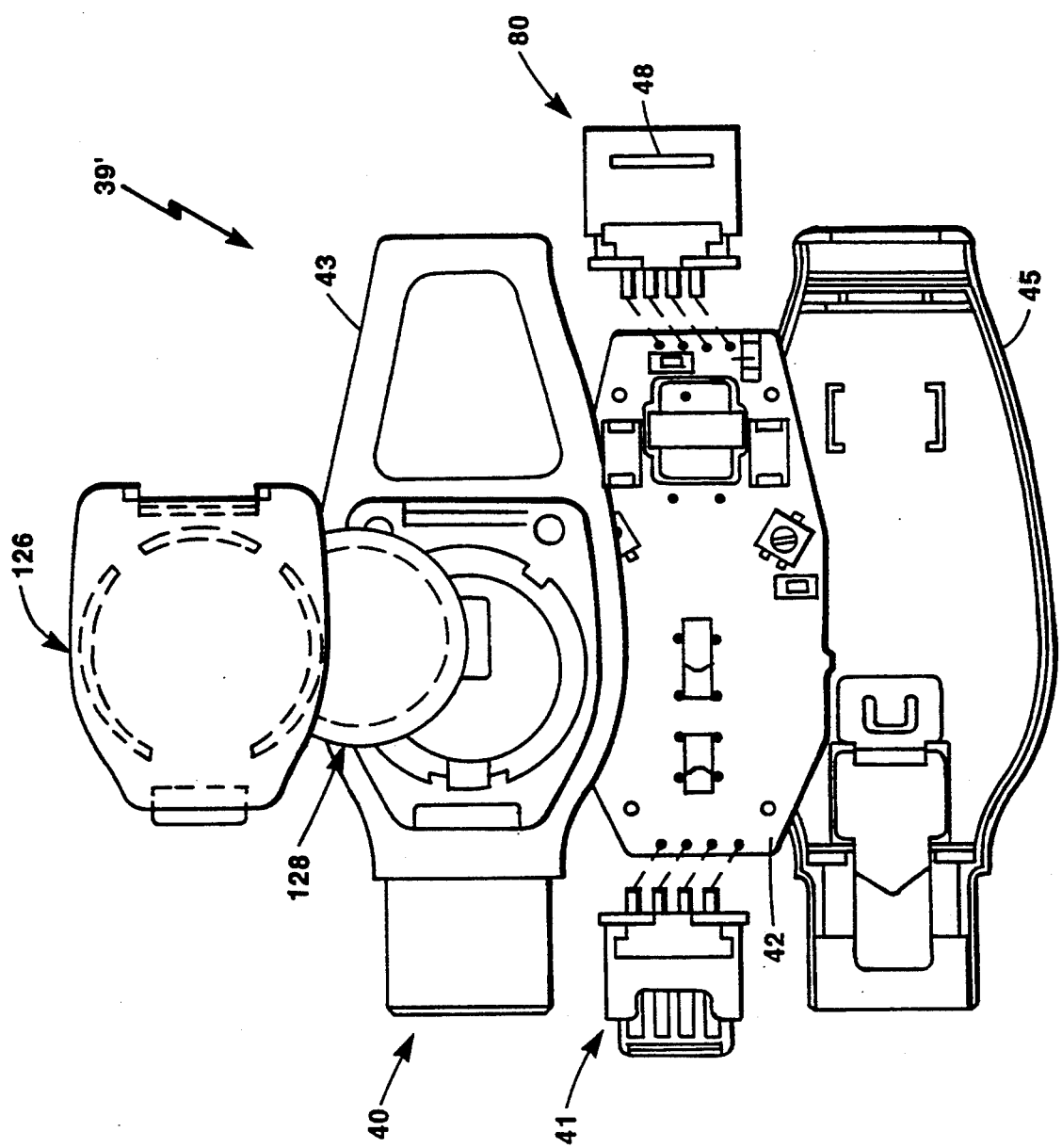
FIG. 12 is an exploded top view of an adapter board interface circuit.

Referring now to FIGS. 12 and 12A in which like elements are provided having like reference designations, an adapter board assembly 39' includes housing 40 here provided from a first cover 43 and a second cover 45. Printed circuit board 42 is disposed between first and second covers 43, 45. Headset connector 41 is coupled to a first end of printed circuit board 42 and a first end of housing 40. Subassembly contact housing 80 is disposed at a second end of housing 40 and is coupled to a second end of the adapter board circuit 42.

Cover 43 is here provided having a cavity region 43a in which a battery 128 is disposed. A battery cover 126 engages cover 43 to thus cover and secure battery 128 in cavity 43a of cover 43.

Figure 13:
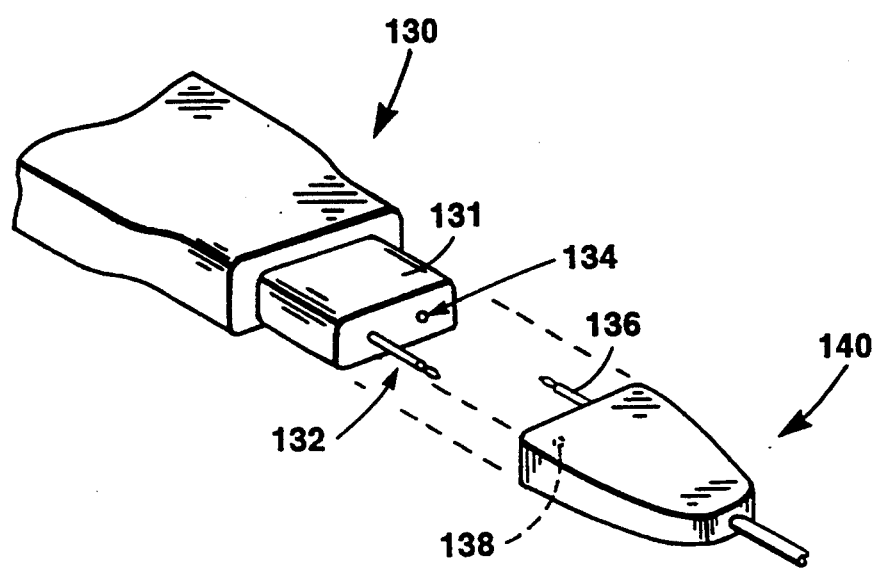
FIG. 13 is a perspective view of mating portions of an adapter board and a headset amplifier connector having a pin and socket arrangement.

Referring now to FIG. 13, a portion of an adapter board housing 130 includes an adapter-board housing connector 131. Connector 131 is here provided having a pin 132 and a socket 134 positioned to mate with a corresponding pin 136 and socket 138 of a headset amplifier connector 140.

When connectors 130, 140 are engaged, a collar 55 which may be of the type described above in conjunction with FIG. 6A may then be disposed over the mating portions to securely hold the portions together. Other locking techniques including those described above in conjunction with FIGS. 9–11 may, of course, also be used.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A headset interface circuit for coupling a headset amplifier to a headset wherein the headset amplifier has a transmit signal path having a first signal transfer characteristic and a receive signal path having a second different signal transfer characteristic, the headset interface circuit comprising:
   an adapter board having a first end adapted to couple to a headset and having a second end adapted to couple to a headset amplifier; and
   a processing circuit disposed on said adapter board for receiving an input signal, from a first one of the headset and the headset amplifier, and for adjusting at least one signal characteristic of the input signal by at least one of shaping, level adjusting, impedance matching, limiting, isolating and RFI reducing, and for providing an output signal to a second one of the headset and the headset amplifier wherein the output signal is provided having a signal characteristic which is more compatible with a signal transfer characteristic of the second one of the headset and the headset amplifier than is the input signal received from the first one of the headset and the headset amplifier.

2. The interface circuit of claim 1 wherein the input signal is provided from the headset amplifier.

3. The interface circuit of claim 2 wherein said processing circuit prevents an audio output signal from exceeding a maximum sound pressure level by limiting at least one of:
   a circuit powering voltage;
   an output signal excursion range; and
   an input signal excursion range.

4. The interface circuit of claim 2 wherein said processing circuit comprises:
   an input signal path; and
   means for varying a resistance of the input signal path to adjust a signal level of a signal propagating on the input signal path.

5. The interface circuit of claim 2 wherein said processing circuit comprises means for matching the impedance of the headset to the impedance of the headset amplifier wherein said means includes at least one of:
   a transformer; and
   a resistor.

6. The interface circuit of claim 2 wherein said processing circuit is provided having a plurality of capacitive circuit elements wherein the frequency response characteristics of said processing circuit are shaped by varying high and low frequency roll-off determining capacitances of said capacitive circuit elements.

7. The interface circuit of claim 2 wherein said processing circuit includes a capacitor connected in shunt across the input signal path, said capacitor for reducing RFI.

8. The interface circuit of claim 2 wherein said processing circuit comprises a transformer for electrically isolating said interface circuit from a first one of the headset amplifier and the headset.

9. The interface circuit of claim 1 wherein the input signal is provided from the headset.

10. The interface circuit of claim 9 wherein said processing circuit includes:
    a first capacitor having a value selected to provide a predetermined high frequency signal response; and
    a second capacitor having a value selected to provide a predetermined low frequency signal response.

11. The interface of claim 9 wherein said processing circuit comprises:
    an input signal path;
    at least one resistor having a resistance which may be varied, said at least one resistor disposed in said input signal path for adjusting a signal level of an input signal propagating along the input signal path.

12. The interface circuit of claim 2 wherein said processing circuit comprises means for matching the impedance of the headset to the impedance of the headset amplifier wherein said means includes a resistor having a variable resistance.

13. The interface of claim 2 wherein said processing circuit includes a capacitor having a first terminal coupled to said input signal path and a second terminal coupled to ground, said capacitor for reducing RFI in said processing circuit.

14. The interface of claim 1 further comprising:
    an impedance matching circuit having an input port coupled to the second end of said adapter board and having an output port;
    a limiter circuit having an input port coupled to the output port of said impedance matching circuit and having an output port; and
    a power gain circuit having an input port coupled to the output port of said limiter circuit and having an output port coupled to the second end of said adapter board.

15. The interface of claim 14 further comprising:
    a first adapter-board connector for coupling the first end of said adapter board to the headset amplifier; and
    a second adapter-board connector for coupling the second end of said adapter board to the headset wherein each of said first and second adapter-board connectors comprise:
    a base having a first portion with a plurality of grooves disposed therein;
    a contact disposed in at least one of said grooves; and
    a fastener, disposed over said contacts, for holding said contacts in said base.

16. The interface of claim 15 wherein said contact is provided having a plurality of fingers each of said fingers disposed in a corresponding one of said grooves and each of said fingers having first and second opposing ends wherein a first end of said contact is disposed on said base and a second of said contact is adapted to electrically couple to a printed circuit board.

17. The interface of claim 16 wherein a collar is disposed over said base for securing said adapter-board connector to the headset amplifier and said collar is provided having first and second opposing surfaces wherein a first one of said first and second opposing surfaces is provided having a first raised region.

18. The interface of claim 17 wherein said collar is provided having a second raised region on the first surface of said collar and wherein said first and second raised regions interlock the headset amplifier.

19. The interface of claim 18 wherein:
    the first and second raised portions are oppositely disposed on the first surface of said collar.

20. The interface of claim 14 wherein said adapter-board connector further comprises a pin and a socket for mating with a headset-amplifier connector.

21. The interface of claim 1 further including:

a battery for powering said processing circuit;

a switch coupled between said battery and said processing circuit; and a current path coupled between said battery and the headset wherein current is drawn through said current path when the headset is coupled to said adapter board wherein in response to current flowing in said current path, said switch is biased into a first position in which power is coupled to said processing circuit and wherein in response to no current flowing in said current path, said switch is biased into a second position to de-couple power from said processing circuit.

22. An adapter board having a first end coupled to a headset and having a second end coupled to a headset amplifier, wherein the adapter board comprises:

a processing circuit for receiving an input signal from a headset microphone and for providing a first output signal to the headset amplifier and for receiving an input signal from the headset amplifier and for providing a second output signal to the headset wherein said processing circuit modifies at least one signal characteristic of the input signal from the headset such that the input signal is compatible with the headset amplifier; and an adapter-board connector coupled between the adapter board and the headset amplifier wherein said adapter-board connector provides a signal path having a predetermined signal transfer characteristic between the headset and the headset amplifier.

23. The adapted board of claim 22 wherein said processing circuit includes signal adjusting means for adjusting at least an amplitude of a signal coupled between the headset and the headset amplifier.

24. The adapter board of claim 22 wherein one said adapter-board connector provides at least one short circuit signal path for at least one signal coupled between the headset and the headset amplifier and provides at least one short circuit signal path for at least one signal coupled between the headset amplifier and the headset.

25. The adapter board of claim 22 wherein said adapter-board connector is provided having at least one transfer characteristic to provide an output signal having output signal characteristics such that the output signal is compatible with the input signal characteristics of a first one of the headset and the headset amplifier.

26. An adapter-board connector for coupling an adapter circuit to a headset amplifier, wherein the adapter-board connector comprises:

a base having a first portion with a plurality of grooves disposed therein;

a contact having first and second opposing ends, wherein said contact is disposed in at least one of said grooves with a first end of said contact coupled to said base; and a fastener, disposed over said contacts, for holding said contacts in said base;

a collar disposed over said base for securing said adapter connector to the headset amplifier.

27. The connector of claim 26 wherein:

said contact is provided having a plurality of fingers each of said fingers disposed in a corresponding one of said grooves and each of said fingers having a first and second opposing ends wherein a first end of said contact is disposed on said base and a second of said contact is provided to electrically couple to a printed circuit board;

said collar is provided having first and second opposing surfaces wherein a first one of said first and second opposing surfaces is provided having a first raised region.

28. The connector of claim 26 wherein said collar is provided having a second raised region on the first surface of said collar.

29. The connector of claim 28 wherein:

the first and second raised portions are oppositely disposed on the first surface of said collar.

30. The connector of claim 29 wherein said contact is provided having a flex portion provide to electrically interface with a corresponding contact of the headset amplifier when the adapter-board connector is coupled to the headset amplifier.

31. The connector of claim 30 wherein said collar is disposed in a first locking position when the adapter-board connector is coupled to the headset amplifier and wherein said collar is disposed in a second non-locking position when the adapter-board connector is not coupled to the headset amplifier.

32. The connector of claim 31 wherein said collar is provided having a recess region provided to accept a corresponding raised portion on the headset amplifier connector.

33. The connector of claim 32 wherein said base region and said fastener engage in a snap-fit relationship.

34. The connector of claim 33 wherein each of said contacts are provided having first ends thereof coupled to a carrier strip and wherein after said contacts are disposed in the grooves of said base, the carrier strip is removed from the first ends of said contacts.

35. The connector of claim 34 wherein the first ends of the contacts are bent to mechanically contact the adapter board circuit.

* * * * *